(12) United States Patent
Sumita

(10) Patent No.: US 8,055,495 B2
(45) Date of Patent: Nov. 8, 2011

(54) APPARATUS AND METHOD FOR TRANSLATING INPUT SPEECH SENTENCES IN ACCORDANCE WITH INFORMATION OBTAINED FROM A POINTING DEVICE

(75) Inventor: Kazuo Sumita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1096 days.

(21) Appl. No.: 11/896,887

(22) Filed: Sep. 6, 2007

(65) Prior Publication Data
US 2008/0208563 A1 Aug. 28, 2008

(30) Foreign Application Priority Data

Feb. 26, 2007 (JP) ................... 2007-045954

(51) Int. Cl.
*G06F 17/28* (2006.01)
*G10L 21/00* (2006.01)
(52) U.S. Cl. ............. 704/2; 704/3; 704/270; 704/275
(58) Field of Classification Search ............... 704/1–10, 704/270, 275
See application file for complete search history.

(56) References Cited

U.S. PATENT DOCUMENTS

| | | | | | |
|---|---|---|---|---|---|
| 5,600,765 | A | * | 2/1997 | Ando et al. | 345/668 |
| 5,608,623 | A | * | 3/1997 | Sata et al. | 704/4 |
| 6,278,968 | B1 | * | 8/2001 | Franz et al. | 704/3 |
| 6,763,331 | B2 | * | 7/2004 | Wakita et al. | 704/251 |
| 6,952,665 | B1 | * | 10/2005 | Shimomura et al. | 704/2 |
| 7,318,021 | B2 | * | 1/2008 | Itoh et al. | 704/5 |
| 7,539,619 | B1 | * | 5/2009 | Seligman et al. | 704/277 |
| 2002/0120436 | A1 | * | 8/2002 | Mizutani et al. | 704/2 |
| 2003/0097250 | A1 | * | 5/2003 | Chino | 704/1 |
| 2003/0120478 | A1 | * | 6/2003 | Palmquist | 704/3 |
| 2005/0192714 | A1 | * | 9/2005 | Fong et al. | 701/1 |
| 2005/0283365 | A1 | | 12/2005 | Mizutani et al. | |
| 2006/0224378 | A1 | * | 10/2006 | Chino et al. | 704/2 |
| 2007/0050183 | A1 | * | 3/2007 | Kao et al. | 704/3 |
| 2007/0100601 | A1 | * | 5/2007 | Kimura | 704/4 |
| 2008/0133245 | A1 | * | 6/2008 | Proulx et al. | 704/277 |

FOREIGN PATENT DOCUMENTS

| | | |
|---|---|---|
| JP | 61-70663 | 4/1986 |
| JP | 09-114634 | 5/1997 |

* cited by examiner

*Primary Examiner* — James S. Wozniak
*Assistant Examiner* — Jialong He
(74) *Attorney, Agent, or Firm* — Finnegan, Henderson, Farabow, Garrett & Dunner, L.L.P.

(57) ABSTRACT

An associated-information storage unit stores a name of associated information and a display position in association with each other. An example storage unit stores a semantic class, an example in a source language, and an example in a target language in association with each other. A dictionary storage unit stores the name of associated information and the semantic class in association with each other. An acquiring unit acquires the name of the associated information corresponding to the display position of the selected associated information from the associated-information storage unit, and acquires a semantic class corresponding to the acquired name of the associated information from the dictionary storage unit. A translation unit acquires an example in the target language corresponding to the acquired semantic class and a speech recognition result from the example storage unit, thereby translating the recognition result.

12 Claims, 17 Drawing Sheets

FIG.2

| NAME | DISPLAY POSITION |
|---|---|
| 故宫 | 10,10 |
| 万里长城 | 50,100 |
| : | : |

FIG.3

```
<p pid="1000">
<s id="1">施設</s>
<j><a id="1">万里の長城</a>にどれくらいで行けますか。</j>
<c>到<a id="1">万里长城</a>要多少时间？</c></p>
```

```
<p pid="1001">
<s id="2">地名</s>
<j><a id="1">明日</a>の<a id="2">上海</a>行きの便をお願いします。</j>
<c>我要<a id="1">明天</a>去<a id="2">上海</a>的航班。</c></p>
```

```
<p pid="1002">
<s id="1">飲物</s>
<j><a id="1">ビール</a>を下さい。</j>
<c>我要<a id="1">啤酒</a>。</c></p>
```

```
<p pid="1003">
<s id="1">料理</s>
<j><a id="1">点心</a>はコースメニューに含まれていますか。</j>
<c>路线菜单里有<a id="1">点心</a>吗？</c></p>
```

```
<p pid="1004">
<s id="1">地名</s>
<j><a id="1">長春</a>に着く頃に教えて下さい。</j>
<c>到<a id="1">长春</a>请告诉我。</c></p>
```

FIG.9

【SEARCHED EXAMPLE】
<p pid="1000">
<s id="1">施設</s> ～901
<j><a id="1">万里の長城</a>にどれくらいで行けますか。</j>～902
<c>到<a id="1">万里长城</a>要多少时间？</c>
</p>

【CANDIDATE TEXT】
故宮にどれくらいで行けますか。～903

【DIFFERENCE FROM EXAMPLE】
万里の長城 ⇔ 故宮
   )      )
 904   905

【CORRESPONDENCE BETWEEN SOURCE LANGUAGE AND TARGET LANGUAGE】
万里の長城 ⇔ 万里长城 ～906

【TRANSLATION RESULT】
到故宫要多少时间？～907

FIG.13

| SEMANTIC CLASS | CASE PARTICLE | CONTENT WORD |
|---|---|---|
| <PLACE NAME> | に | 行く |
| <PLACE NAME> | に | 着く |
| <PLACE NAME> | に | 近く |
| <PLACE NAME> | の | 空港 |
| <PLACE NAME> | の | 駅 |
| <PLACE NAME> | — | 行き |
| <CUISINE NAME> | は | おいしい |
| <CUISINE NAME> | に | 付く |
| <CUISINE NAME> | の | 値段 |
| : | : | : |

1224
1301
1302
1303

APPARATUS AND METHOD FOR TRANSLATING INPUT SPEECH SENTENCES IN ACCORDANCE WITH INFORMATION OBTAINED FROM A POINTING DEVICE

CROSS-REFERENCE TO RELATED APPLICATIONS

This application is based upon and claims the benefit of priority from the prior Japanese Patent Application No. 2007-45954, filed on Feb. 26, 2007; the entire contents of which are incorporated herein by reference.

BACKGROUND OF THE INVENTION

1. Field of the Invention

The present invention relates to an apparatus and a method for translating input speech to synthesize and output the translated speech, thereby enabling communication by speech between people who use different languages as their native languages, and to a computer program product for executing the method.

2. Description of the Related Art

Recently, there has been high demand for implementation of a speech translation apparatus that supports communication between people who use different languages as their native languages. Such a speech translation apparatus basically uses a unit that recognizes speech, a unit that translates a character string obtained as a result of speech recognition, and a unit that synthesizes the character string obtained as a result of translation by speech, and can be constituted by sequentially executing a speech recognition process, a translation process, and a speech synthesis process.

A speech translation system that recognizes speech spoken by a user to output character information has been already put to practical use in a format of packaged software or the like. Further, a machine translation system using written words (text) as an input has already been put to practical use similarly in the format of package software or the like. A speech synthesis system has already been put to practical use, and by appropriately using the software, a speech translation apparatus can be realized.

In realizing speech translation, various speech recognition methods and machine translation methods can be used. Regardless of employing any method, improvements on accuracy of speech recognition and machine translation have been major issues.

For example, in example-based machine translation in which translation is performed by using bilingual corpus of source language and target language, all texts cannot be prepared as examples, and as the number of examples increases, texts to be searched relative to an input text increase. Therefore, there is a problem in that user's time and labor are required for selecting an appropriate text.

Further, because the contents of communication by the speech translation apparatus are diversified, to translate the contents by speech accurately, speech recognition, machine translation, and speech synthesis relative to large-scale vocabularies are required. As for words in categories of common nouns, verbs, adjectives, and adverbs, the numbers thereof are limited to some extent, and therefore these words can be registered in advance in a dictionary used for speech recognition, machine translation, and speech synthesis. However, proper nouns such as place names, person's names, cuisine names, store's names, and company names are created almost daily, and all proper nouns cannot be registered in the dictionary in general.

Thus, there are occasions, as experienced in overseas travel, in which a tourist himself needs to speak proper nouns such as place names and store's names in the country or area in the native language, due to no registration of appropriate words for translation in the dictionary. However, in the case of a tourist whose phonetic system is largely different from the language of the country he is traveling, it is difficult to accurately pronounce the words as the native language, and such a situation frequently occurs that the pronounced proper noun cannot be understood.

As the simplest solution to this problem, by using a mobile terminal having a display function of travel guide information and map information to point a specific part in the travel guide information or map information displayed on a display of the mobile terminal, the user can indicate a desired place.

However, the intention of the user cannot be sufficiently communicated only by indicating a place or a place name. For example, it cannot be communicated only by indicating certain facilities whether the user wishes to go to the facilities, or the user wishes to confirm how long it takes to go there, what kind of event they are having now, or how much it costs to go there.

Therefore, a method can be considered in which a display unit that displays the travel guide information and the map information, a unit that indicates a place name or a facility name from the presented information, and a speech translation unit are combined, and translated spoken sound of the user is output to communicate the user's intention.

As a technique involved with this method, such a technique has been proposed that a speech recognizing unit and a map display unit are included, to recognize a pointing operation performed by the user on a map simultaneously with speech recognition, and a semantic structure of a text in which a demonstrative pronoun included in the spoken text is replaced by position information of a specific map is output based on timewise relation between these (for example, see JP-A H09-114634 (KOKAI)).

However, according to the method disclosed in JP-A H09-114634 (KOKAI), the accuracy of speech recognition can be improved by analyzing semantic representation including the demonstrative pronoun, referring to the content instructed by the user. However, there is a problem in that the machine translation accuracy cannot be improved by using the instructed content.

SUMMARY OF THE INVENTION

According to one aspect of the present invention, a speech translation apparatus includes an associated-information storage unit configured to store a name of associated information relating to speech and a display position of the associated information, in association with each other; an example storage unit configured to store a semantic class representing a semantic attribute of a word, an example in a source language including the word, and an example in a target language acquired by translating the example in the source language, in association with each other; a dictionary storage unit configured to store the name of the associated information and the semantic class of the name of the associated information, in association with each other; a display unit configured to acquire the display position of the associated information from the associated-information storage unit and to display the associated information at the acquired display position; a speech receiving unit configured to receive speech spoken in the source language; a recognizing unit configured to recognize the received speech to generate a source language character-string in the source language; a selection receiving unit configured to receive a selection of the associated information displayed at the acquired display position; an acquiring unit configured to acquire the name of the associated information corresponding to the display position of the associated information the selection of which is received, from the associated-information storage unit, and to acquire the semantic class corresponding to the acquired name of the associated information from the dictionary storage unit; and a translation unit configured to translate the source language character-string into the target language by acquiring an example in the target language from the example storage unit, the example corresponding to the semantic class acquired from the dictionary storage unit and the source language character-string.

According to another aspect of the present invention, a speech translation method includes receiving speech spoken in a source language; recognizing the received speech to generate a source language character-string in the source language; receiving a selection of associated information relating to spoken speech displayed on a display unit; acquiring a name of the associated information corresponding to a display position of the associated information the selection of which is received, from an associated-information storage unit that stores the name of associated information and the display position of the associated information in association with each other; acquiring a semantic class representing a semantic attribute of the name of the associated information corresponding to the acquired name of the associated information, from a dictionary storage unit that stores the name of the associated information and the semantic class in association with each other; and translating the recognition result into the target language by acquiring an example in a target language corresponding to the acquired semantic class and the source language character-string, from an example storage unit that stores the semantic class of a word, an example in the source language including the word, and an example in the target language acquired by translating the example in the source language, in association with each other.

A computer program product according to still another aspect of the present invention causes a computer to perform the method according to the present invention.

BRIEF DESCRIPTION OF THE DRAWINGS

FIG. 2 is a schematic diagram for explaining an example of data structure of associated information stored in an associated-information storage unit;

FIG. 3 is a schematic diagram for explaining an example of data structure of a bilingual example stored in an example storage unit;

FIG. 9 is a specific example of the machine translation process;

FIG. 13 is a schematic diagram for explaining an example of data structure of co-occurrence information;

DETAILED DESCRIPTION OF THE INVENTION

Exemplary embodiments of an apparatus and a method for translating speech and a computer program product for executing the method according to the present invention will be explained below in detail with reference to the accompanying drawings. Note that, while it is assumed herein that the source language is Japanese and the target language is Chinese for simplifying explanations, it is needless to say that the type of the language is not limited to Japanese and Chinese, and the invention is also applicable to other language pairs.

The speech translation apparatus according to a first embodiment of the present invention displays associated information such as a map and a cuisine name related to a speech content of a user on a screen, and assigns only an example associated with the same semantic class as that of the associated information instructed by the user from the displayed associated information as a search range of the example.

Figure 1:
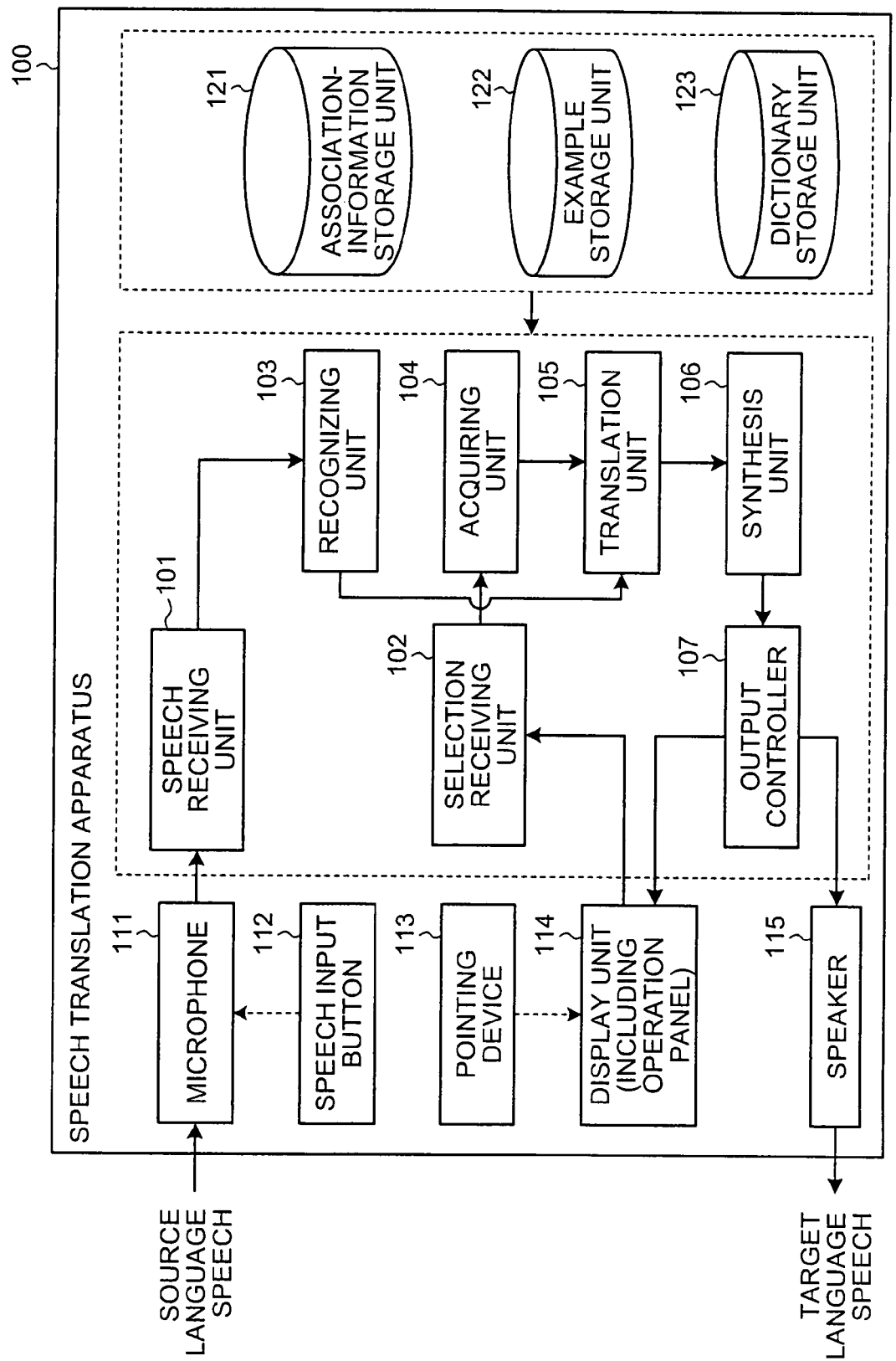
FIG. 1 is a block diagram of a configuration of a speech translation apparatus according to a first embodiment of the present invention.

As shown in FIG. 1, a speech translation apparatus 100 includes a microphone 111, a speech input button 112, a pointing device 113, an operation panel 114, a speaker 115, an associated-information storage unit 121, an example storage unit 122, a dictionary storage unit 123, a speech receiving unit 101, a selection receiving unit 102, a recognizing unit 103, an acquiring unit 104, a translation unit 105, a synthesis unit 106, and an output controller 107.

The microphone 111 inputs source language speech spoken by the user. The speech input button 112 is pressed at the time of starting take-in of the speech spoken by the user from the microphone 111. As explained below, there are a translation button for instructing to start a translation process and a speech button for specifying output of synthesized speech as operation buttons other than the speech input button 112, but those buttons are not shown in the drawings.

The pointing device 113 specifies associated information such as a place, facilities, cuisine, or the like by pointing an object displayed on the operation panel 114, and is formed of a pen or a mouse. In the explanations below, it is assumed that a pen is used as the pointing device 113.

The operation panel 114 is a display unit such as a liquid crystal display that displays information related to an operation of the speech translation apparatus 100, and is configured so that it can specify the displayed information by receiving the operation by the pointing device 113.

In the first embodiment, the operation panel 114 displays a place, facilities, or the like in a map format, and facilities, cuisine name, or the like in a list format. The operation panel 114 selectably displays a candidate of a recognition result generated by the recognizing unit 103.

The speaker 115 outputs speech synthesized by the synthesis unit 106.

The associated-information storage unit 121 stores the associated information such as a map or a cuisine name list to be displayed on the operation panel 114. As shown in FIG. 2, a name in a target language of the associated information is stored in the associated-information storage unit 121 in association with a display position indicating coordinates required for displaying the associated information on the operation panel 114. In FIG. 2, an example of specifying the display position by X-coordinate and Y-coordinate on the screen is shown.

The method of specifying the display position is not limited thereto, and any method can be applied so long as it can specify the associated information from the position on the operation panel 114 indicated by the pointing device 113. For example, when the map is displayed on the operation panel 114, the display position to be displayed such as facilities on the map can be stored in the associated-information storage unit 121. Further, the name in the source language of the associated information can be stored in the associated-information storage unit 121 in association with the target language.

The example storage unit 122 stores a bilingual example used for the translation process by the translation unit 105. As shown in FIG. 3, the bilingual example is described in a tag format using a tag enclosed by signs "<" and ">", and a part enclosed by tag "<p pid="NNN">" and tag "</p>" indicates one bilingual example.

The respective bilingual examples further include Japanese text enclosed by tag "<j>" and tag "</j>", Chinese text enclosed by tag "<c>" and tag "</c>", and semantic class information enclosed by tag "<s id="LLL">" and tag "</s>". "LLL" denotes a numerical value.

A numerical value "MMM" that associates the respective words in the Japanese text and the Chinese text with each other is given for a word enclosed by tag "<a id="MMM">" and tag "</a>". Semantic class information enclosed by tag "<s id="LLL">" and tag "</s>" indicates a semantic attribute of the word corresponding to the tag "<a id="LLL">" associated with the numerical value "LLL".

Figure 4:
FIG. 4 is a schematic diagram for explaining an example of data structure of dictionary information.

The dictionary storage unit 123 stores dictionary information in which a word in the source language and a word in the target language are associated with each other. As shown in FIG. 4, the dictionary storage unit 123 stores words in Chinese text, words in Japanese text, and semantic classes indicating the semantic attribute of respective words in association with each other, as the dictionary information. In one language, when there is no translated word in the other language, sign "–" indicates that there is no corresponding translated word. When acquiring the semantic class corresponding to the associated information by the acquiring unit 104, the acquiring unit 104 refers to the dictionary storage unit 123.

The associated-information storage unit 121, the example storage unit 122, and the dictionary storage unit 123 can be formed of any generally used recording medium such as a hard disk drive (HDD), an optical disk, a memory card, and a random access memory (RAM).

The speech receiving unit 101 performs sampling relative to a speech analog signal input from the microphone 111, and converts the analog signal to a stereo digital signal to output the digital signal. A conventionally used A/D conversion technique can be applied to a process performed by the speech receiving unit 101.

The selection receiving unit 102 receives selection of the associated information or a candidate of the recognition result indicated on the operation panel 114 by the pointing device 113.

The recognizing unit 103 performs the speech recognition process in which a candidate of the recognition result, which is a character string of the corresponding source language, is generated, upon reception of an input of the digital speech signal from the speech receiving unit 101. In the speech recognition process, any generally used speech recognition methods, which use linear predictive coding (LPC) analysis, Hidden Markov model (HMM), dynamic programming, neural network, and N-gram language model, can be applied.

The recognizing unit 103 calculates a likelihood indicating probability of the candidate for each candidate, generates a predetermined number of candidates in a descending order of the calculated likelihood, and outputs the candidate. Upon reception of the associated information by the selection receiving unit 102, the recognizing unit 103 replaces a demonstrative pronoun (this, here, that) relating to a near field included in the recognition result by the name of the received associated information. In a replacement process of the demonstrative pronoun, any conventionally used technique such as the technique described in JP-A H09-114634 (KOKAI) can be used.

The acquiring unit 104 acquires the semantic class corresponding to the associated information received by the selection receiving unit 102 from the dictionary storage unit 123.

The translation unit 105 translates the recognition result acquired by the recognizing unit 103 into a character string in the target language by an example-based machine translation method. Specifically, the translation unit 105 acquires an example of the source language text agreeing with or similar to the recognition result from the example storage unit 122, and acquires an example of the target language text corresponding to the example of the acquired source language text to translate the recognition result.

At this time, according to the first embodiment, the translation unit 105 searches for an adaptable example from the examples associated with the same semantic class as that acquired by the acquiring unit 104. That is, the translation unit 105 narrows the search area of examples down to only an example associated with the semantic class agreeing with the semantic class of the instructed associated information. Accordingly, translation accuracy can be improved.

The synthesis unit 106 performs the speech synthesis process in which the character string acquired by the translation unit 105 is converted to a speech signal. Any generally used method such as a speech pieces-editing speech synthesis, a formant speech synthesis, and a speech corpus-based speech synthesis can be applied to the speech synthesis process performed by the synthesis unit 106.

The output controller 107 controls an output process of various pieces of information relative to the operation panel 114 and the speaker 115. Specifically, the output controller 107 performs a process for DA-converting a speech signal generated by the synthesis unit 106 to output the signal to the speaker 115, a process for outputting a candidate of the generated recognition result to the operation panel 114, and the like.

Figure 5:
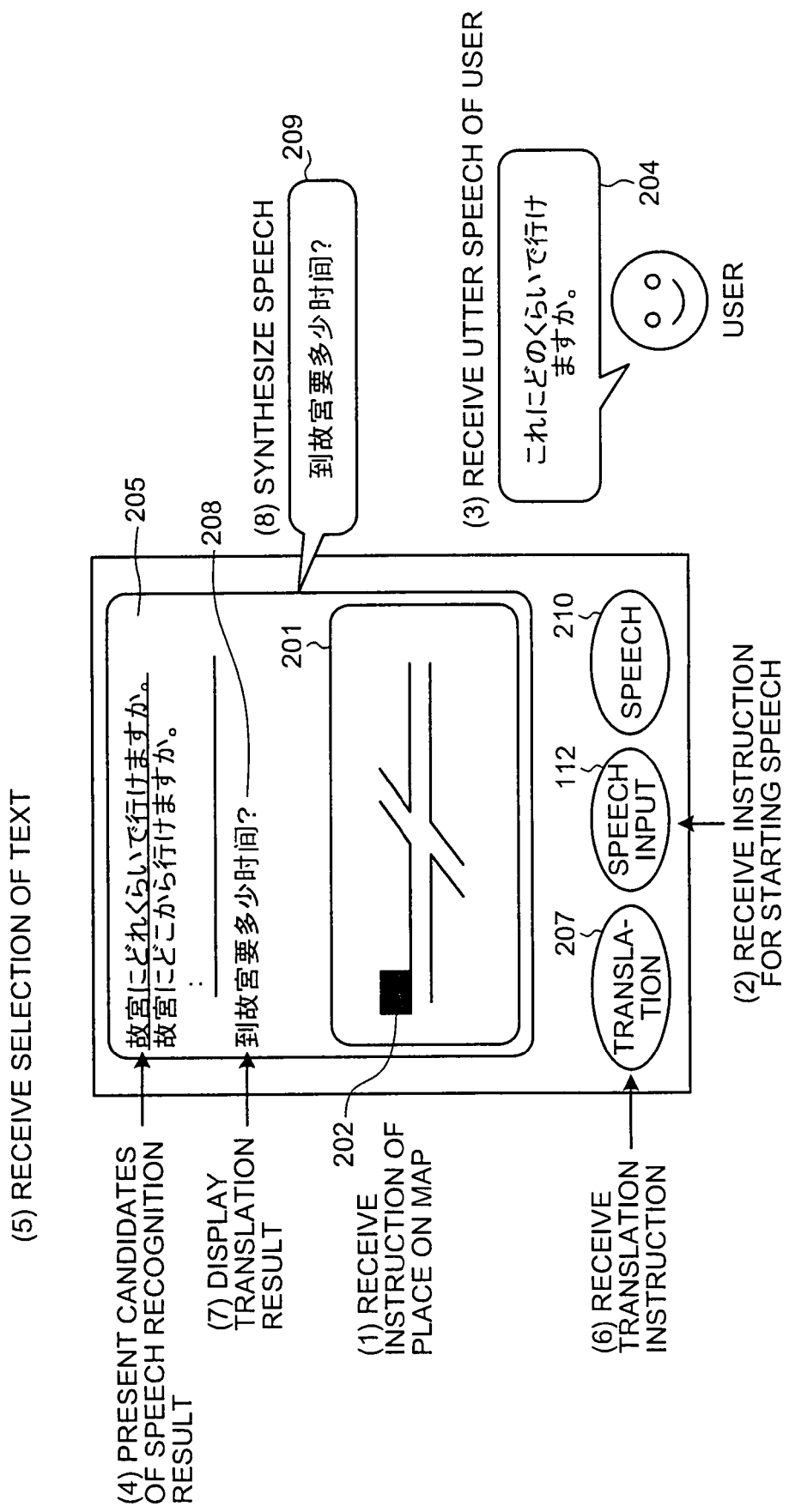
FIG. 5 is a schematic diagram for explaining an operation image of a speech translation process in the first embodiment.

A specific example of an overall flow of the speech translation process according to the first embodiment is explained with reference to FIG. 5. In FIG. 5, an operation sequence in the speech translation process is indicated by figures in brackets.

An instruction of place 202 on map 201 specified by the user using the pointing device 113 such as a pen is received (1). An instruction for starting speech by pressing the speech input button 112 is received (2). Uttered speech 204 of the user is taken in after pressing the speech input button 112 (3). Candidates of a source language text having high validity synthesized based on the result of speech recognition performed based on the taken-in speech signal and a proper noun corresponding to the place instructed at (1) are displayed (4). A selection of candidate 205 specified by the user from the displayed text candidates is received (5). A translation instruction of the selected candidate 205 is received upon pressing of a translation button 207 (6). The translation process is executed and translation result 208 thereof is displayed (7). Speech 209 synthesized with the translation result is output upon pressing of a speech button 210 (8).

Figure 6A:
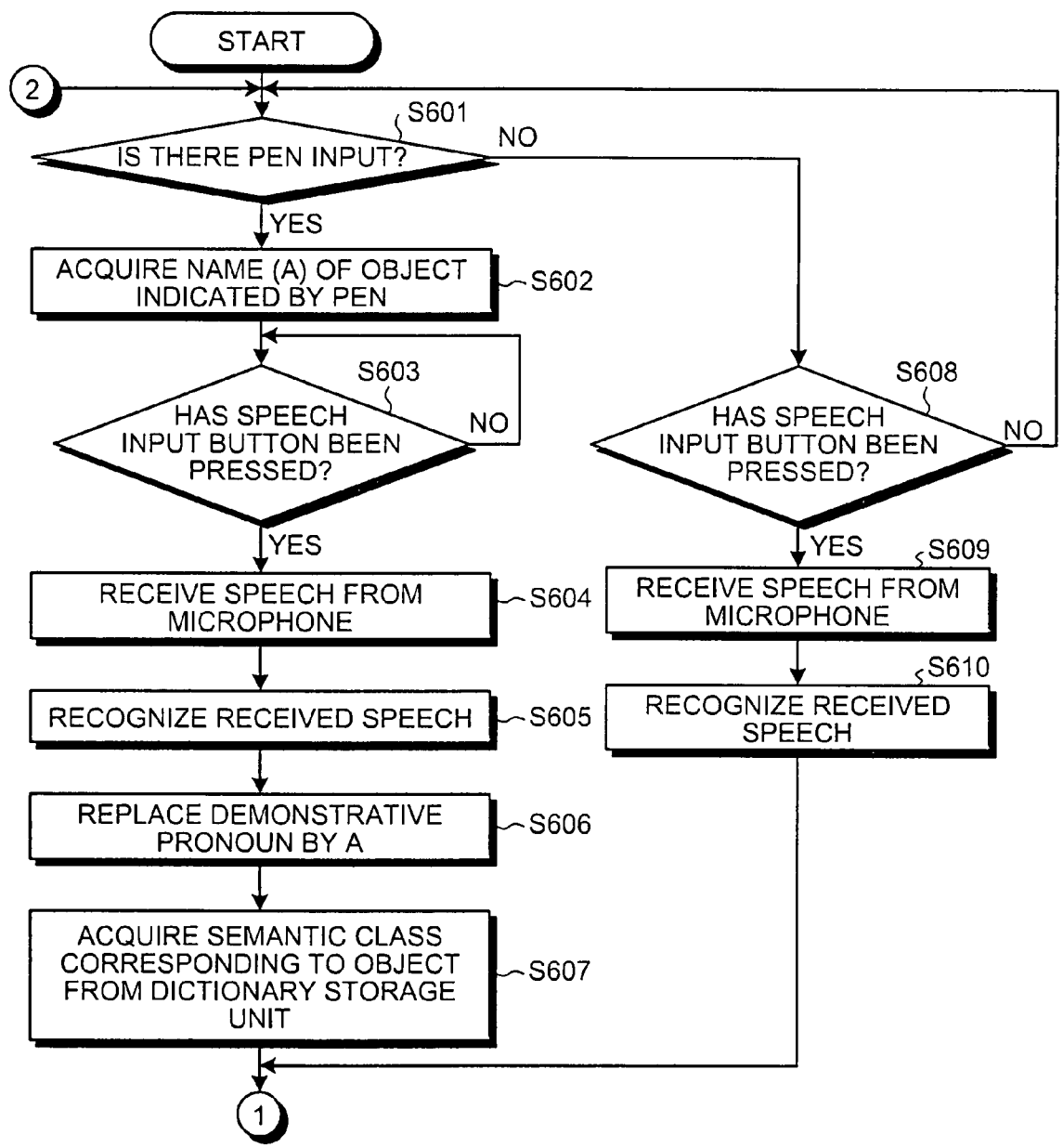
FIG. 6A is a flowchart of an overall flow of the speech translation process in the first embodiment.
Figure 6B:
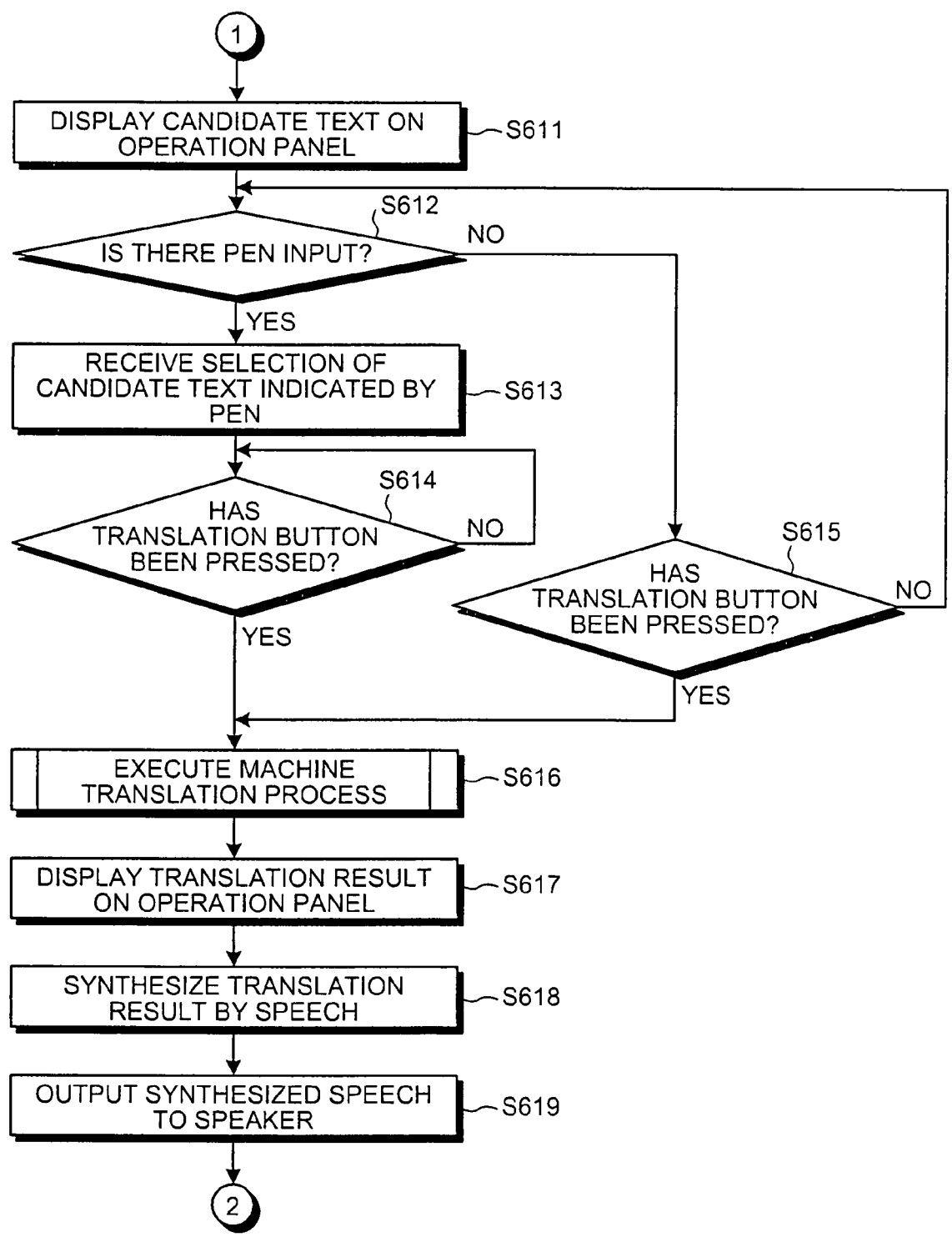
FIG. 6B is another flowchart of an overall flow of the speech translation process in the first embodiment.

The speech translation process performed by the speech translation apparatus 100 according to the first embodiment is explained with reference to FIGS. 6A and 6B.

The speech translation process in the first embodiment is based on an assumption that the associated information such as a map or a cuisine name list stored in the associated-information storage unit 121 is being displayed on the operation panel 114.

First, the selection receiving unit 102 determines whether there is an input, that is, a pen input by the pointing device 113 (step S601). The pen input means that the user indicates the displayed associated information (hereinafter, "object").

When there is the pen input (YES at step S601), the selection receiving unit 102 acquires the name of the object indicated by the pointing device 113 from the associated-information storage unit 121 (step S602). Specifically, the selection receiving unit 102 acquires the name of the object corresponding to an indicated display position from the associated-information storage unit 121. When only the name in the target language is stored in the associated-information storage unit 121, the name in the source language is acquired by referring to the dictionary storage unit 123. The acquired name in the source language is designated as "A".

The speech receiving unit 101 determines whether the speech input button 112 has been pressed (step S603). When the speech input button 112 has not been pressed (NO at step S603), the process is repeated until the speech input button 112 is pressed. When the speech input button 112 is pressed (YES at step S603), the speech receiving unit 101 receives a speech input from the microphone 111 (step S604).

The recognizing unit 103 executes the speech recognition process relative to the received speech (step S605). The recognizing unit 103 generates a predetermined number of candidates of the recognition result having high likelihood by the speech recognition process.

The recognizing unit 103 detects a demonstrative pronoun included in the candidates of the recognition result and replaces the detected demonstrative pronoun by name A of the object acquired at step S602 (step S606).

Figure 7:
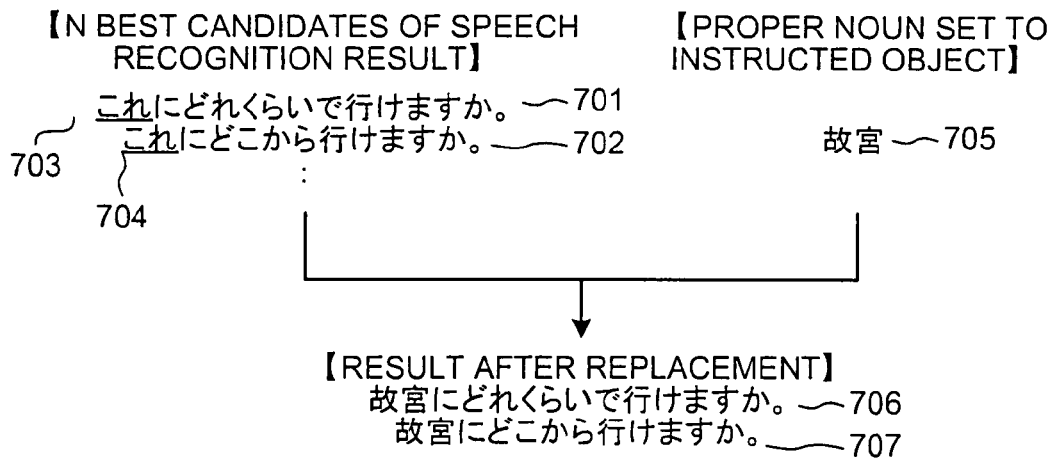
FIG. 7 is a schematic diagram for explaining a specific example of replacement of a recognition result.

FIG. 7 is an example when candidate 701 indicating "How long does it take to go there?" and candidate 702 indicating "How can I get there?" are generated as the candidates of the recognition result in the source language speech in Japanese. The respective candidates include demonstrative pronouns 703 and 704 respectively indicating "there" are included.

In the example, it is assumed that the user indicates a certain object on the map displayed on the operation panel 114 and word 705 (Gugong) is acquired as a proper noun of the indicated object.

In this case, candidates 706 and 707 in which the part of demonstrative pronouns 703 and 704 are respectively replaced by words 705 are generated, respectively.

Referring back to FIG. 6A, the acquiring unit 104 acquires the semantic class corresponding to the indicated object from the dictionary storage unit 123 (step S607). The acquired semantic class is referred to by the machine translation process at step S616 described later.

When it is determined that there is no pen input (NO at step S601), the speech receiving unit 101 determines whether the speech input button 112 has been pressed (step S608). When the button has not been pressed (NO at step S608), control returns to step S601 to repeat the process.

When the speech input button 112 is pressed (YES at step S608), the speech receiving unit 101 receives a speech input from the microphone 111 (step S609). Pressing of the speech input button 112 is detected at step S608 when the user presses the speech input button 112 to speak a word without indicating the object (NO at step S601).

The recognizing unit 103 executes the speech recognition process relative to the received speech (step S610).

After the demonstrative pronoun is replaced at step S606, or after the speech recognition process is executed at step S610, the output controller 107 displays the candidates of the generated recognition result (hereinafter, "candidate texts") on the operation panel 114 (step S611).

The selection receiving unit 102 determines whether there is a pen input again (step S612). The pen input here stands for an input for selecting any one of the displayed candidate texts.

When there is the pen input (YES at step S612), the selection receiving unit 102 receives selection of the candidate text indicated by the pointing device 113 (step S613). The selection receiving unit 102 then determines whether the translation button has been pressed (step S614). When the button has not been pressed (NO at step S614), the selection receiving unit 102 repeats the process until the translation button is pressed.

At step S612, when it is determined that there is no pen input (NO at step S612), the selection receiving unit 102 determines whether the translation button has been pressed (step S615). When the button has not been pressed (NO at step S615), the selection receiving unit 102 returns to step S612 to repeat the process.

When it is determined that the translation button has been pressed at step S614 or S615 (YES at step S614 and step S615), the translation unit 105 refers to the example storage unit 122 to acquire an adaptable example, thereby executing the machine translation process for performing translation (step S616).

The machine translation process is executed relative to the candidate text selected according to a preset rule, for example, selected at step S614 or when the candidate text is not selected by the user, the candidate text having the highest likelihood. The machine translation process is described later in detail.

The output controller 107 displays the translation result of the machine translation process on the operation panel 114 (step S617). When output of the synthesized speech is instructed by the user by pressing the speech button, the synthesis unit 106 performs speech syntheses relative to the translation result (step S618). The output controller 107 then outputs the synthesized speech to the speaker 115 (step S619).

Figure 8:
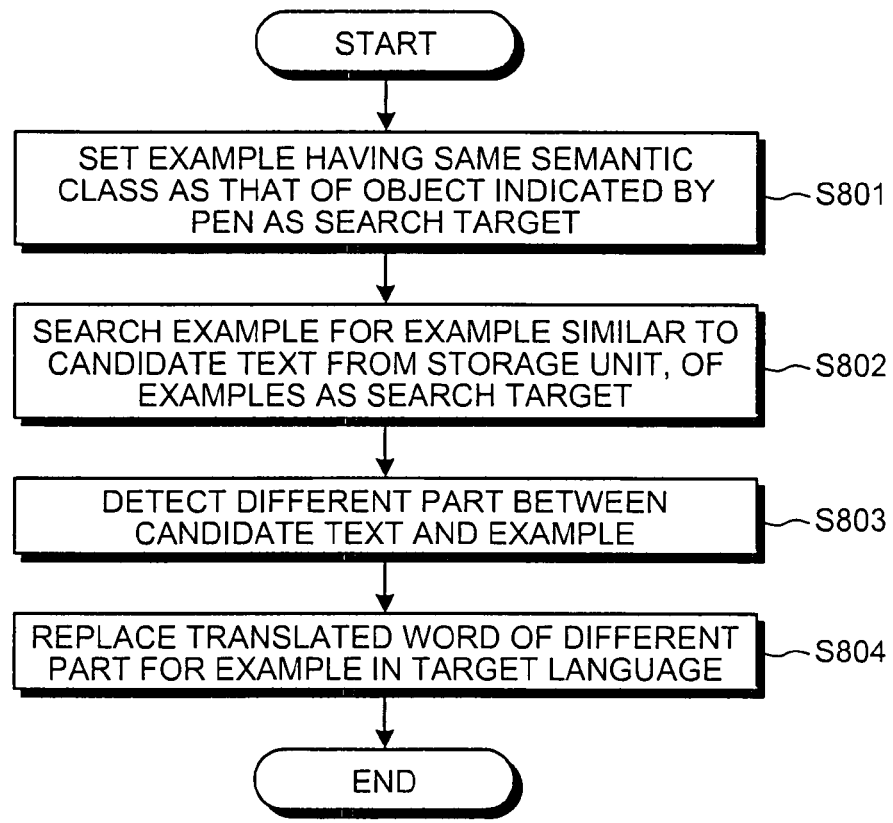
FIG. 8 is a flowchart of an overall flow of a machine translation process.

The machine translation process at step S615 is explained in detail with reference to FIG. 8.

The translation unit 105 sets examples having the same semantic class as that of the object indicated by the pointing device 113 (pen) as search targets (step S801).

The translation unit 105 acquires an example in the source language similar to the candidate text, of the examples as the search target, from the example storage unit 122, to acquire an example in the target language corresponding to the acquired example in the source language from the example storage unit 122 (step S801).

The translation unit 105 detects a different part between the candidate text and the example in the source language (step S803). Subsequently, the translation unit 105 acquires words (translated words) in the target language corresponding to the different part, for the acquired example in the target language, and replaces the different part by the acquired translated words (step S804).

Example search/different part-replacement process from steps S802 to S804 can be executed according to the same method as that of the conventionally used example-based machine translation. The first embodiment is different from the conventional method such that the search area of the example is narrowed down to the example corresponding to the same semantic class as that of the indicated object (step S801).

FIG. 9 is an example in which it is assumed that the object corresponding to Chinese 401 (Gugong) in FIG. 4 is indicated on the operation panel 114 by the user (YES at step S601), and semantic class 402 (facility) in FIG. 4 indicating facilities is acquired (step S607). It is based on an assumption that candidate text 903 indicating "How long does it take to go to Gugong?" is selected as the candidate text.

Because semantic class 402 in FIG. 4 is acquired in this example, a similar text is searched from the examples having the same semantic class 901 (facility) as semantic class 402 (step S802).

The different part between candidate text 903 "How long does it take to go to Gugong?" and the searched similar text 902 "How long does it take to go to the Great Wall?" is a part of word 904 (the Great Wall) and word 905 (Gugong) (step S803).

It can be specified that the part to be replaced by the example in the target language is Chinese 906 from the associated information (<a id="1">) between the source language text and the target language text. Accordingly, example 907 is generated, in which Chinese 906 is replaced by Chinese word (Gugong) corresponding to word 905, which is the different part (step S804).

An example of applying the method according to the first embodiment to Japanese-English translation is explained with reference to FIG. 10.

Figure 10:
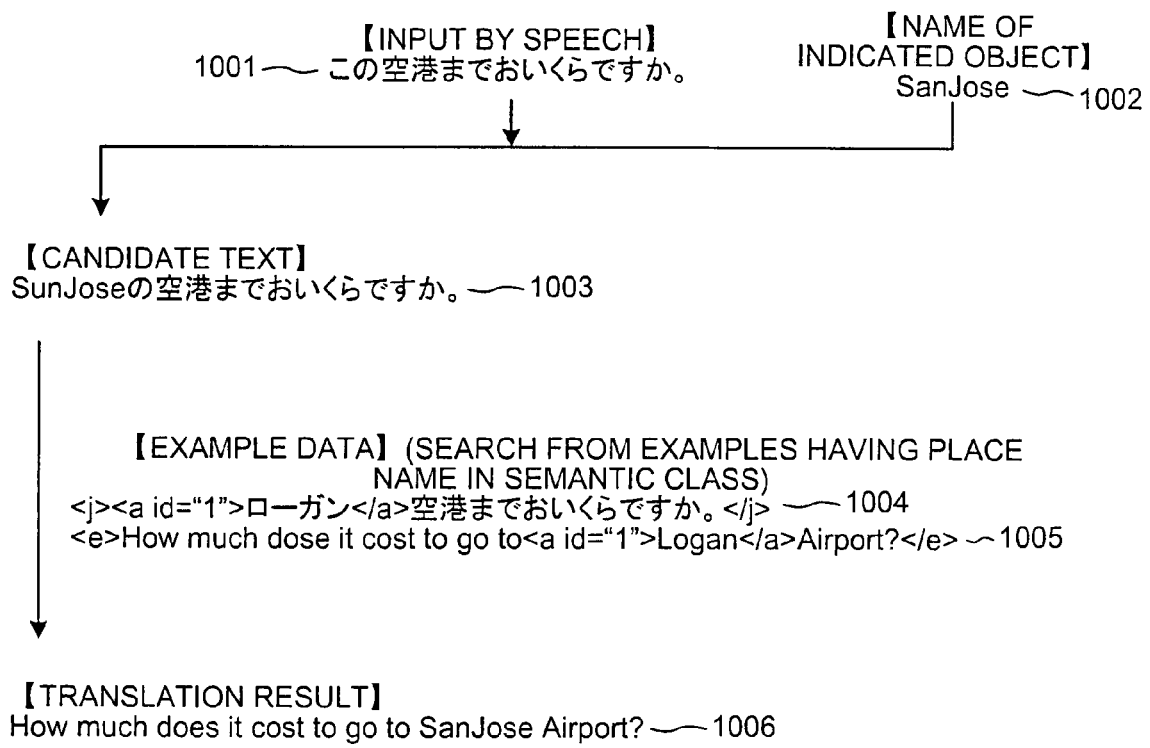
FIG. 10 is an example of various data processed when Japanese is translated into English.

FIG. 10 is an example in which Japanese 1001 meaning "How much does it cost to go to the airport?" is input (step S604), while the object corresponding to "San Jose" on the map is pointed (YES at step S601), and a corresponding name 1002 (San Jose) is acquired (step S602).

Candidate text 1003 "How much does it cost to go to San Jose airport?" is generated in which the demonstrative pronoun has been replaced by name 1002 (step S606). Similar example 1004 is acquired from the example storage unit 122 (step S802). In this example, it is assumed that the bilingual example in which Japanese example is associated with English example is stored in the example storage unit 122.

Translation result 1006 in which the part of the airport name, which is the different part from the candidate text, has been replaced from English example 1005 corresponding to example 1004 is output (step S804).

In the above flowchart, the speech recognition result is displayed so that the user can select one. However, the configuration can be such that similar examples are searched for relative to each speech recognition result and the searched examples are shown to the user, so that the user can select one. According to this method, there is a merit in that even if an error is included in the speech recognition result, the searched example does not include any error, and therefore the example is presented to the user, thereby giving favorable impression to the user.

Figure 11A:
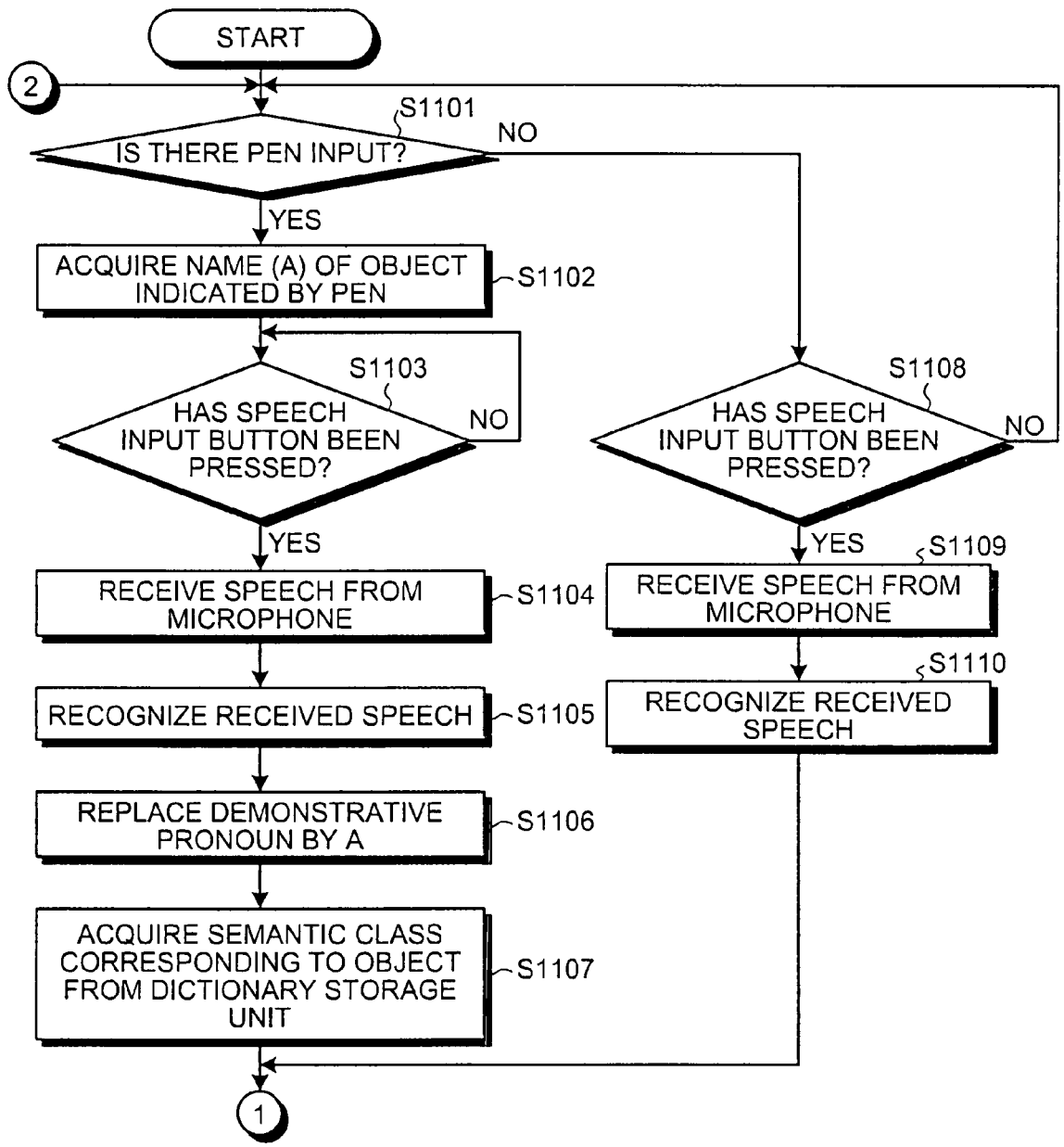
FIG. 11A is a flowchart of an overall flow of a speech translation process in a modified example of the first embodiment.
Figure 11B:
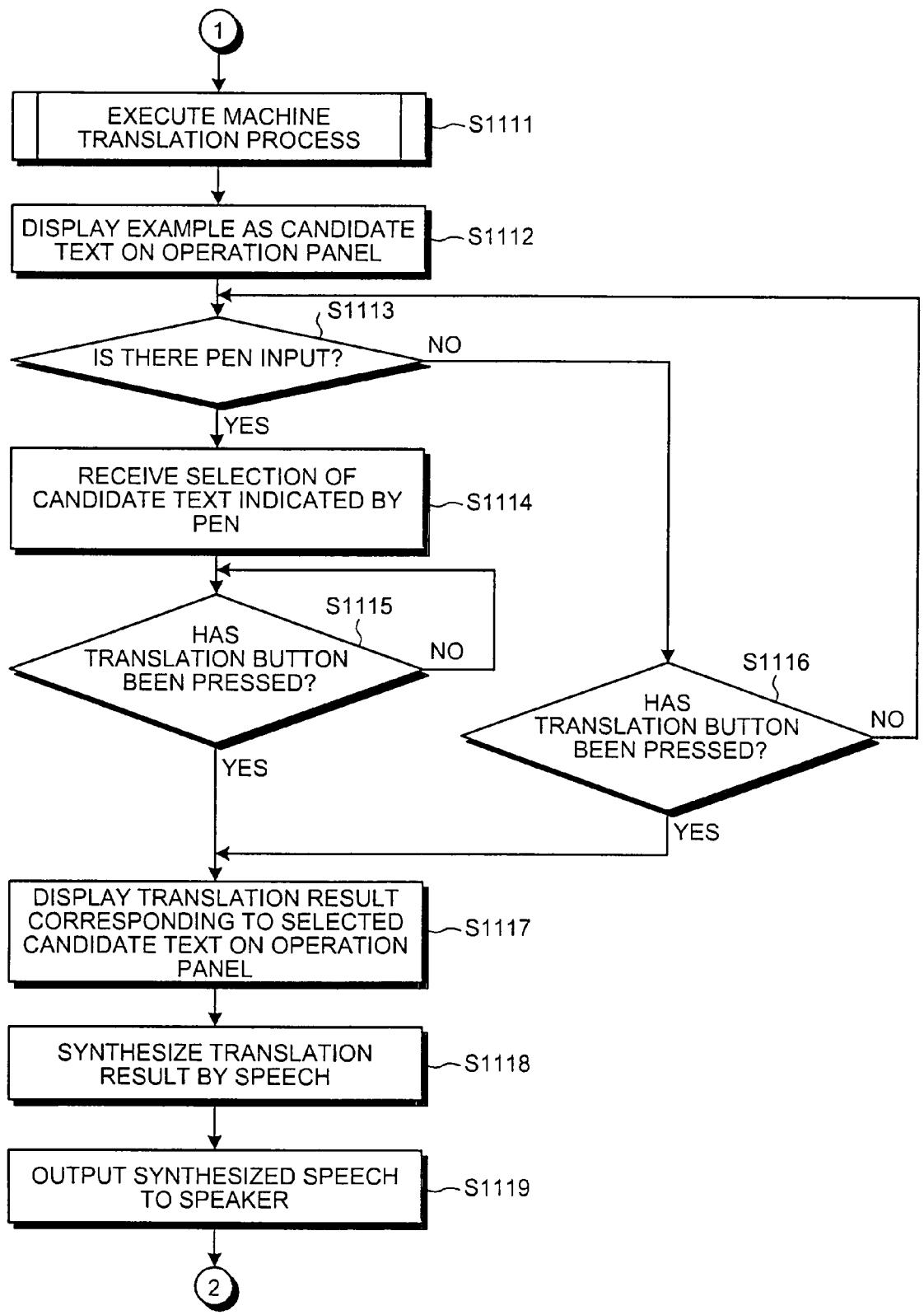
FIG. 11B is another flowchart of an overall flow of the speech translation process in the modified example of the first embodiment.

A speech translation process performed by the speech translation apparatus 100 according to a modified example of the first embodiment is explained with reference to FIGS. 11A and 11B.

The object selection reception process, the speech reception process, and the recognition process from steps S1101 to S1110 are the same as from steps S601 to 610 in the speech translation apparatus 100 according to the first embodiment, and therefore explanations thereof will be omitted.

After the speech recognition process (step S1110) or a recognition-result replacement process (step S1106), the machine translation process by the translation unit 105 is executed in the modified example (step S1111). The output controller 107 displays the example in the source language searched in the machine translation process as the candidate text (step S1112) on the operation panel 114.

A candidate-text selection-reception process and a translation-button reception process from steps S1113 to S1116 are the same as from steps S612 to S615 in the speech translation apparatus 100 according to the first embodiment, and therefore the explanations thereof will be omitted.

The output controller 107 acquires the translation result corresponding to the selected candidate text from the translation results of the machine translation process executed at step S1111, and displays the translation result on the operation panel 114 (step S1117).

The speech synthesis process and a synthesized-speech output process from steps S1118 to S1119 are the same as from step S618 to S619 in the speech translation apparatus 100 according to the first embodiment, and therefore explanations thereof will be omitted.

As explained above, according to the speech translation apparatus according to the first embodiment, by indicating a place name or a cuisine name displayed on the display unit by the pointing device, the user does not need to speak a proper noun, which is difficult to pronounce. Further, the search range of candidates of speech recognition or machine translation relative to the speech spoken by the user together with an instruction can be narrowed down by a semantic class of the instructed proper noun. Accordingly, the machine translation accuracy can be improved.

The speech translation apparatus according to a second embodiment improves the accuracy of the speech translation process by using co-occurrence information relating to the semantic class of the indicated object to narrow down the speech recognition process.

Figure 12:
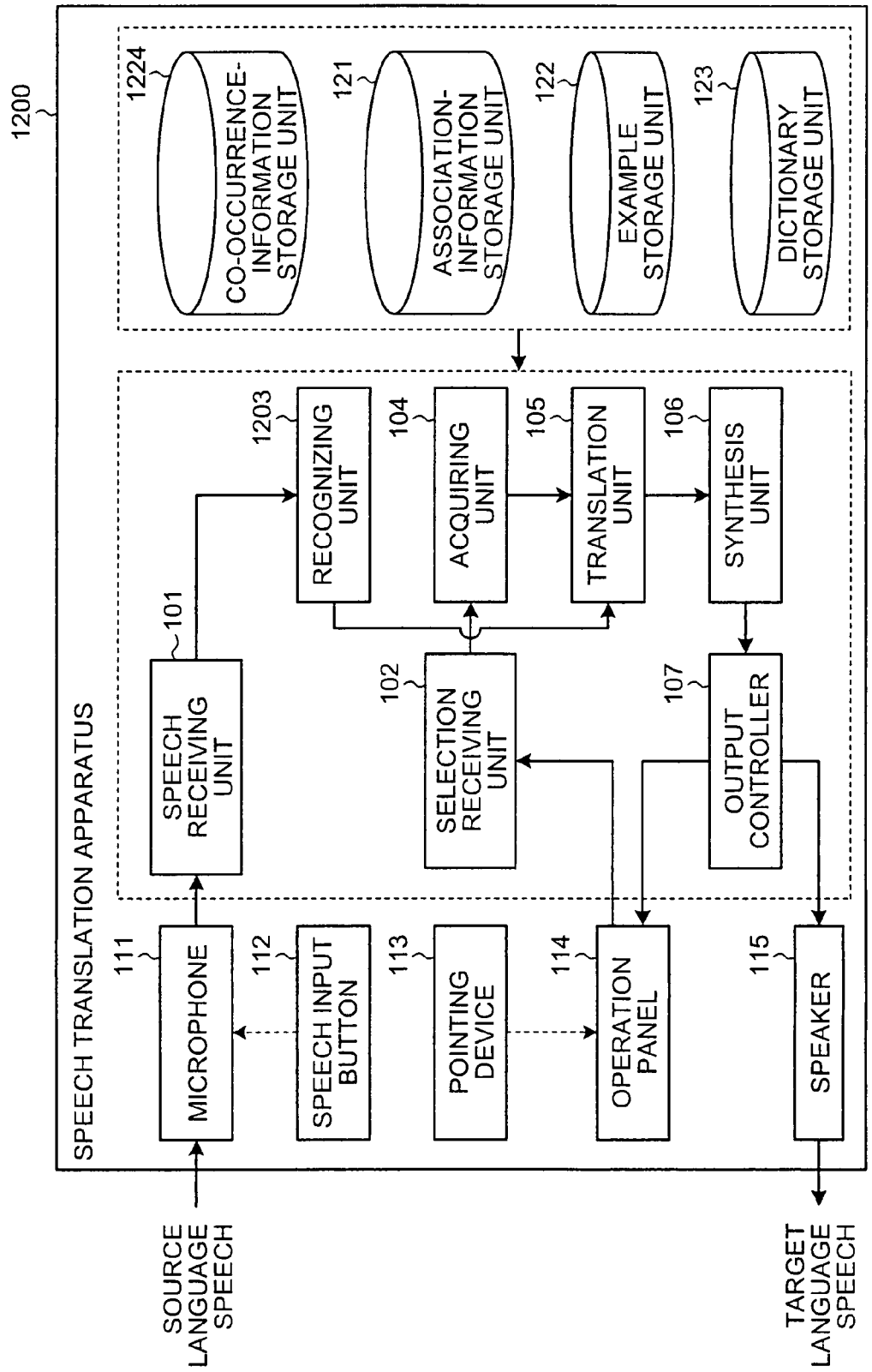
FIG. 12 is a block diagram of a configuration of a speech translation apparatus according to a second embodiment of the present invention.

As shown in FIG. 12, a speech translation apparatus 1200 includes the microphone 111, the speech input button 112, the pointing device 113, the operation panel 114, the speaker 115, the associated-information storage unit 121, the example storage unit 122, the dictionary storage unit 123, a co-occurrence-information storage unit 1224, the speech receiving unit 101, the selection receiving unit 102, a recognizing unit 1203, the acquiring unit 104, the translation unit 105, the synthesis unit 106, and the output controller 107.

The second embodiment is different from the first embodiment in that the co-occurrence-information storage unit 1224 is added and the function of the recognizing unit 1203 is different from that of the first embodiment. Because other configurations and functions are the same as in FIG. 1, which is a block diagram of the configuration of the speech translation apparatus 100 according to the first embodiment, like reference numerals refer to like parts and explanations thereof will be omitted.

The co-occurrence-information storage unit 1224 stores co-occurrence information in which a semantic class and a co-occurrence word, which is a word used together with the word having the semantic class are associated with each other. As shown in FIG. 13, the co-occurrence information includes semantic class, case particle, and content word. The co-occurrence information indicates that the word having, for example, semantic class 1301 (cuisine name) is used together with case particle 1302 "with" and content word 1303 "come".

The recognizing unit 1203 is different from the recognizing unit 103 according to the first embodiment in that it acquires a co-occurrence word used together with the semantic class acquired by the acquiring unit 104 from the co-occurrence-information storage unit 1224 to narrow the candidate of the recognition result of the speech recognition process down to a candidate including the acquired co-occurrence word.

Figure 14A:
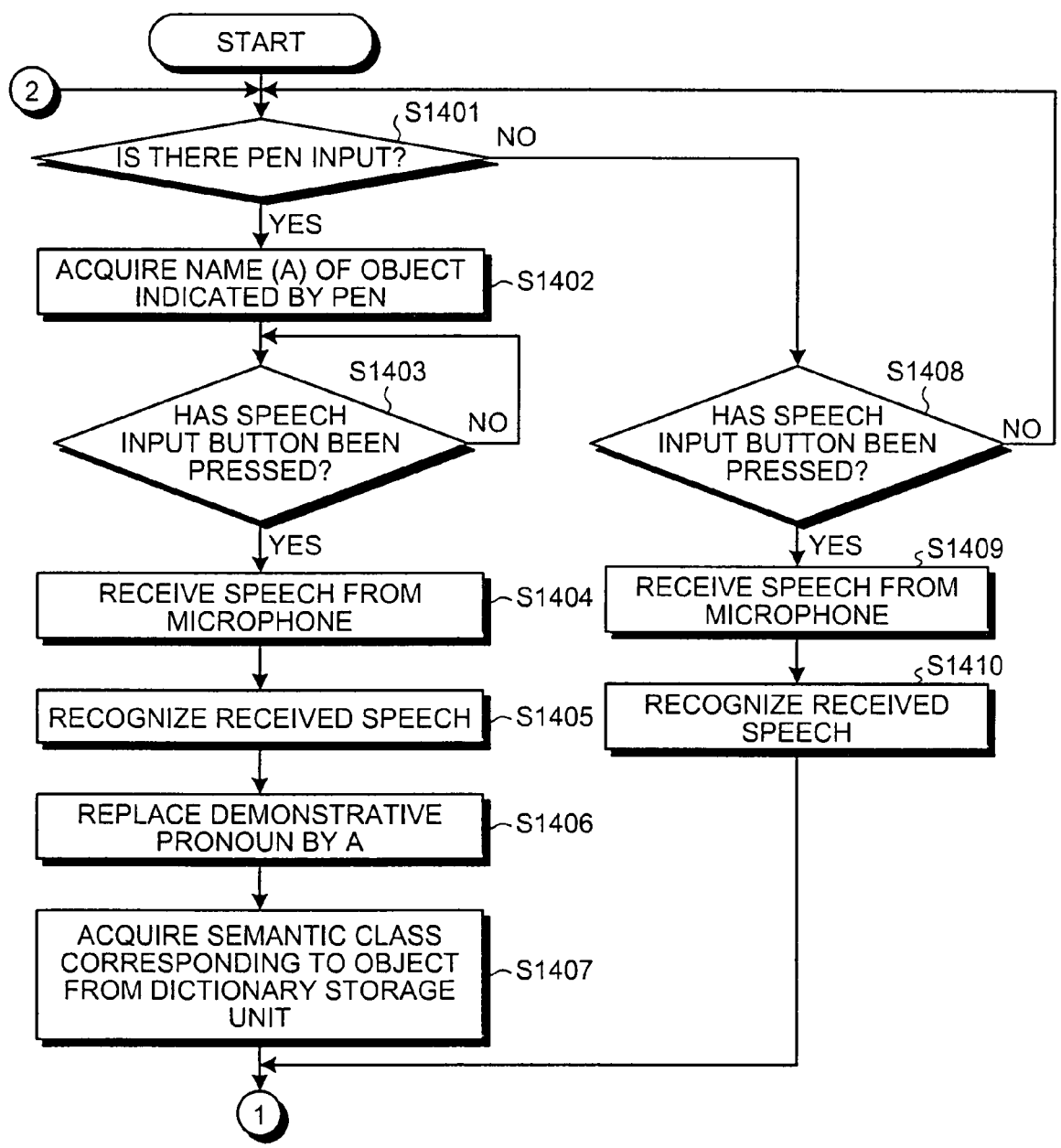
FIG. 14A is a flowchart of an overall flow of a speech translation process in the second embodiment.
Figure 14B:
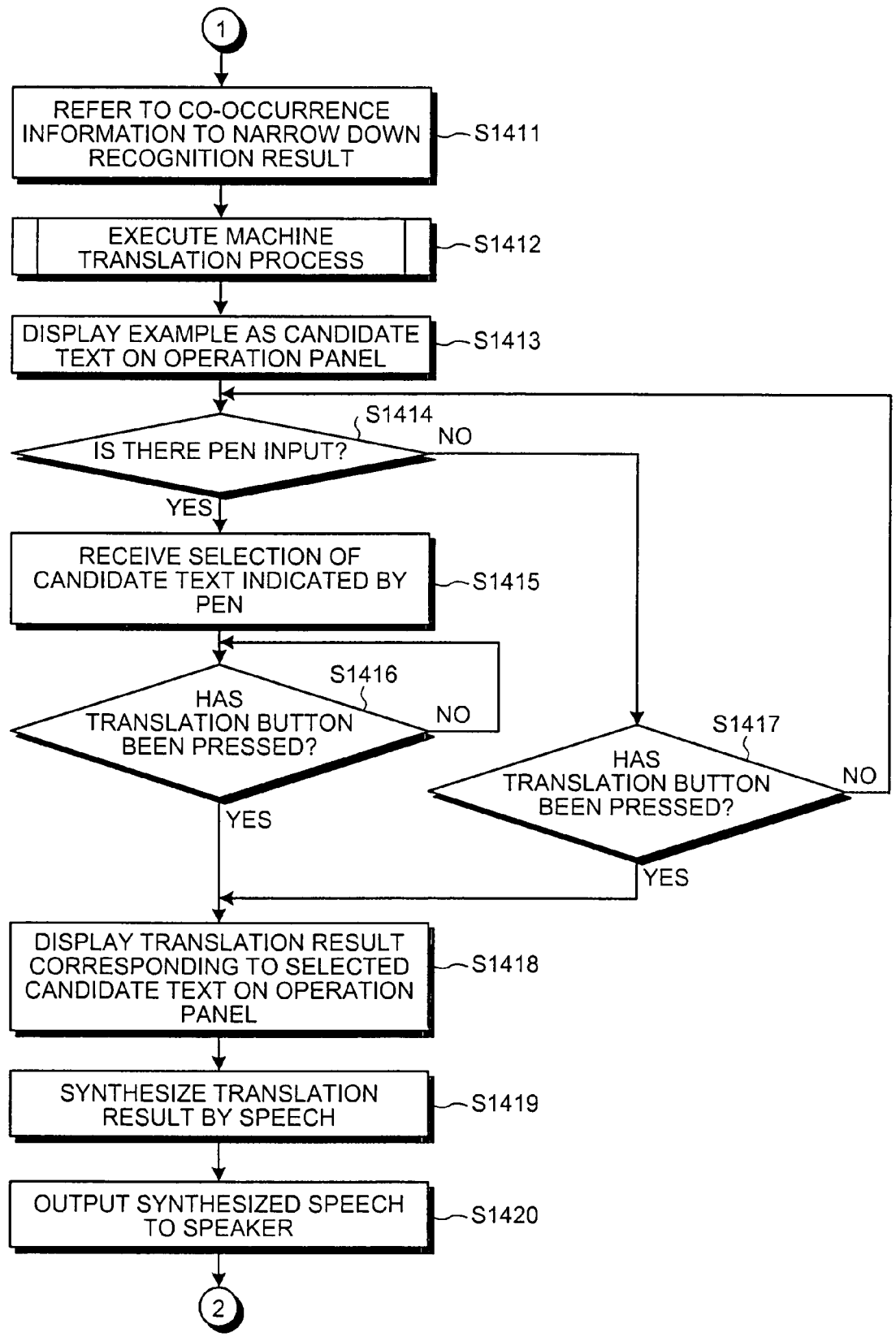
FIG. 14B is another flowchart of an overall flow of the speech translation process in the second embodiment.

The speech translation process performed by the speech translation apparatus 1200 according to the second embodiment is explained with reference to FIGS. 14A and 14B.

The second embodiment is different from the flowchart of FIG. 11 relating to the modified example of the first embodiment in that a narrowing-down process of the recognition result at step S1411 is added. Other processes are the same as those in FIG. 11, and therefore explanations thereof will be omitted.

At step S1411, the recognizing unit 1203 acquires the co-occurrence information including the acquired semantic class from the co-occurrence-information storage unit 1224 to narrow the candidate of the recognition result down to only the candidate adaptable for the acquired co-occurrence information. Accordingly, the accuracy of the speech recognition process is improved, and as a result, the accuracy of the speech translation process can be improved.

Figure 15:
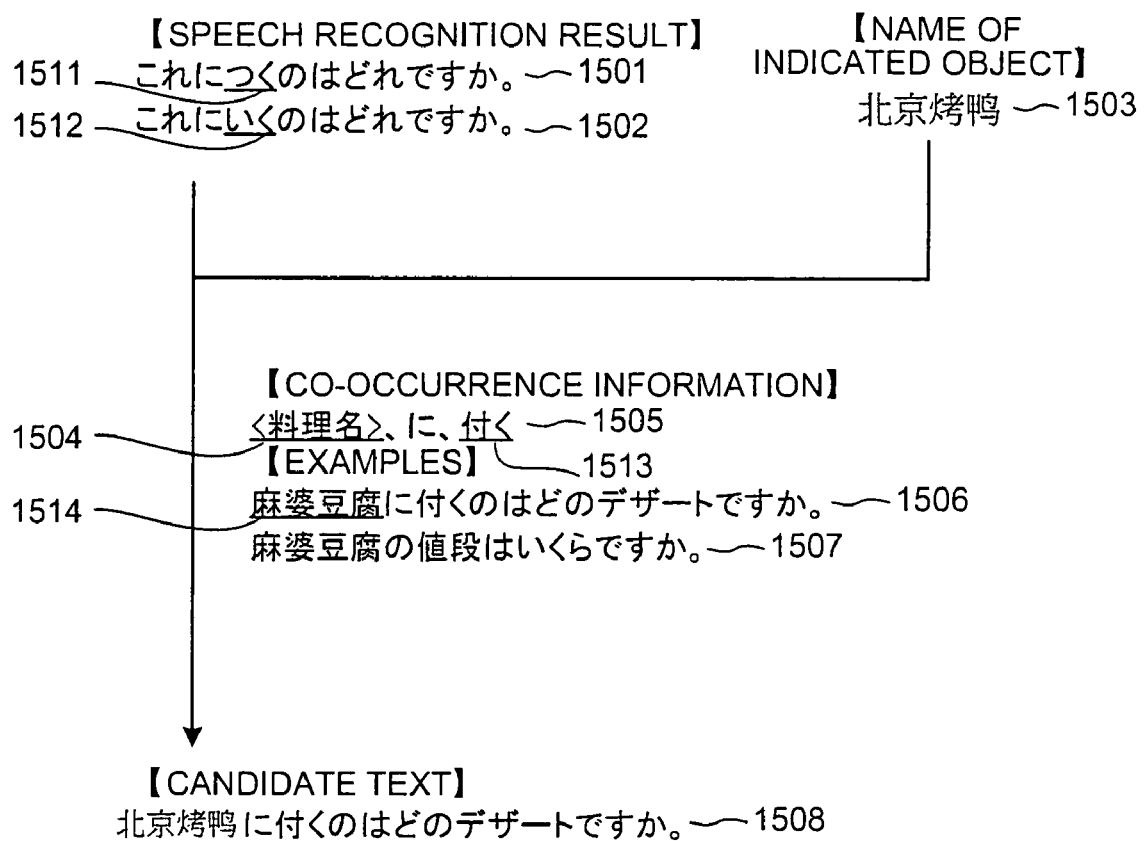
FIG. 15 is a schematic diagram for explaining an example of various data to be processed.
Figure 16:
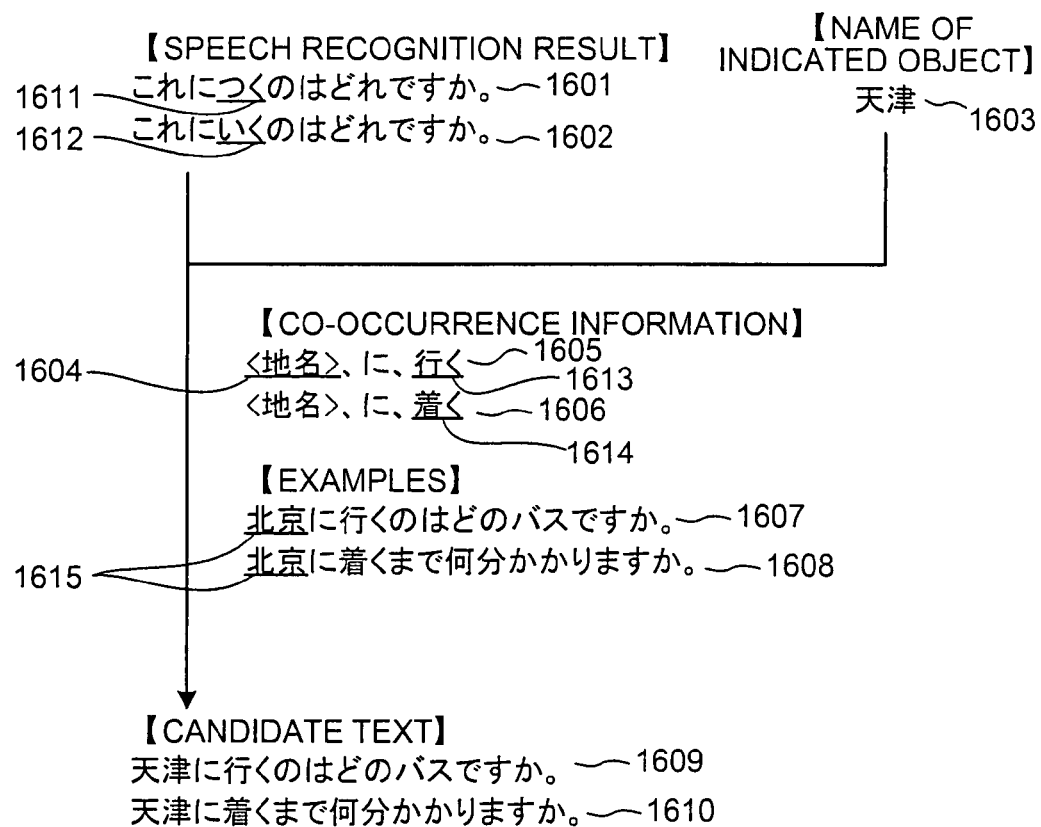
FIG. 16 is another schematic diagram for explaining an example of various data to be processed.

A specific example of the speech translation process in the second embodiment is explained next. FIG. 15 is a schematic diagram for explaining an example of various data to be processed when the speech is input while indicating the displayed cuisine name. FIG. 16 is a schematic diagram for explaining an example of various data to be processed when the speech is input while indicating the displayed place name.

In FIGS. 15 and 16, it is assumed that because similar Japanese speeches are input, two same candidates are generated as the candidate of the recognition result. That is, in the examples in FIGS. 15 and 16, even if the same candidate is generated, because the candidate of the recognition result is narrowed down based on the semantic class of the indicated object, different appropriate candidates are selected, respectively.

When the cuisine name is indicated as shown in FIG. 15, recognition result 1501, "Which one does come with this?", and recognition result 1502, "Which one does go to this?", are generated as the speech recognition result (step S1405), and name 1503 of indicated cuisine name is acquired (step S1402).

In this example, because the object relating to the cuisine name is indicated, semantic class 1504 indicating the cuisine name is acquired as the semantic class of the object (step S1407). Recognition result 1501 including word 1511 having the same pronunciation as that of the content word 1513 included in co-occurrence information 1505 corresponding to the semantic class 1504, of words 1511 and 1512, which are the different part between recognition results 1501 and 1502, (step S1411), is acquired.

Example 1506, "Which dessert does come with the bean-curd soup?", and example 1507, "How much is the bean-curd soup?" are searched as examples similar to the recognition result 1501 (step S802).

When it is assumed that example 1506 having high similarity with the recognition result 1501 is selected, candidate text 1508 in which the word in the target language corresponding to the word 1514, which is the different part, is replaced by name 1503 is generated and displayed on the operation panel 114 (step S1413).

On the other hand, when the place name is indicated as shown in FIG. 16, recognition results 1601 and 1602 the same as recognition results 1501 and 1502 shown in FIG. 15 are generated as the speech recognition results (step S1405), and name 1603 of the indicated place name is acquired (step S1402).

In this example, because the object related to the place name is indicated, semantic class 1604 indicating the place name is acquired as the semantic class of the object (step S1407). Further, in this case, there is co-occurrence information corresponding to the semantic class 1604 and including each word, respectively, relative to the words 1611 and 1612, which are the different parts between the recognition result 1601 and the recognition result 1602.

That is, relative to the word 1611, there is co-occurrence information 1605 including content word 1613 having the same pronunciation as that of the word 1611. Further, relative to the word 1612, there is co-occurrence information 1606 including content word 1614 having the same pronunciation as that of the word 1612.

Therefore, both the recognition results 1601 and 1602 are left as the candidates (step S1411).

Next, as examples similar to the recognition results 1601 and 1602, example 1607 (Which bus should I take to Beijing?) and example 1608 (How long does it take to go to Beijing?) are searched (step S802).

A candidate text 1609 and a candidate text 1610 are generated, in which a word in the target language corresponding to the word 1615, which is the different part, is replaced by name 1603, respectively, and displayed on the operation panel 114 (step S1413).

Thus, according to the speech translation apparatus according to the second embodiment, the speech recognition process can be executed with high accuracy by using the co-occurrence information relating to the semantic class of the indicated object to narrow down the speech recognition process. As a result, the accuracy of the speech recognition process can be improved.

Figure 17:
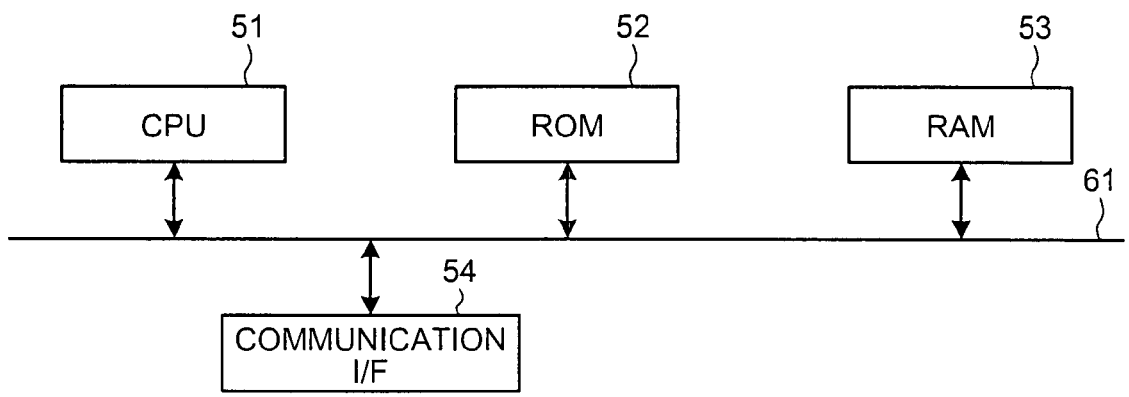
FIG. 17 is a schematic diagram for explaining a hardware configuration of the speech translation apparatus according to the first or the second embodiment.

The hardware configuration of the speech translation apparatus according to the first or the second embodiment is explained with reference to FIG. 17.

The speech translation apparatus according to the first or the second embodiment includes a controller such as a central processing unit (CPU) 51, a storage unit such as a read only memory (ROM) 52 and a random access memory (RAM) 53, a communication I/F 54 that performs communication by connecting to a network, and a bus 61 that connects these units.

A speech translation program executed by the speech translation apparatus according to the first or the second embodiment is incorporated in the ROM 52 or the like beforehand and provided.

The speech translation program executed by the speech translation apparatus according to the first or the second embodiment can be provided by being recorded on a computer-readable recording medium such as a compact-disk read only memory (CD-ROM), a flexible disk (FD), a compact disk recordable (CD-R), and a digital versatile disk (DVD), in an installable format file or an executable format file.

The speech translation program executed by the speech translation apparatus according to the first or the second embodiment can be stored in a computer connected to a network such as the Internet, and can be downloaded via the network. The speech translation program executed by the speech translation apparatus according to the first or the second embodiment can be provided or distributed via the network such as the Internet.

The speech translation program executed by the speech translation apparatus according to the first or the second embodiment has a module configuration including the units described above (the speech receiving unit, the selection receiving unit, the recognizing unit, the acquiring unit, the translation unit, the synthesis unit, and the output controller). As actual hardware, the CPU 51 reads the speech translation program from the ROM 52, and executes this program, thereby loading the above units in a main storage. Accordingly, the respective units are generated in the main storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech translation apparatus comprising:
   an associated-information storage unit configured to store a name of associated information relating to speech and a display position of the associated information, in association with each other;
   an example storage unit configured to store a semantic class representing a semantic attribute of a word, an example in a source language including the word, and an example in a target language acquired by translating the example in the source language, in association with each other;
   a dictionary storage unit configured to store the name of the associated information and the semantic class of the name of the associated information, in association with each other;
   a display unit configured to acquire the display position of the associated information from the associated-information storage unit and to display the associated information at the acquired display position;
   a speech receiving unit configured to receive speech spoken in the source language;
   a recognizing unit configured to recognize the received speech to generate a source language character-string in the source language;
   a selection receiving unit configured to receive a selection of the associated information displayed at the acquired display position;
   an acquiring unit configured to acquire the name of the associated information corresponding to the display position of the associated information the selection of which is received, from the associated-information storage unit, and to acquire the semantic class corresponding to the acquired name of the associated information from the dictionary storage unit; and
   a translation unit configured to translate the source language character-string into the target language by
      defining a search range of a subset of examples in the target language narrowed to those examples stored in the example storage unit having the same semantic class as the acquired semantic class, and
      acquiring an example in the target language corresponding to the source language character-string and having the same semantic class as the acquired semantic class from the subset of examples.

2. The apparatus according to claim 1, wherein
   the recognizing unit recognizes the received speech to generate candidates of the source language character-string;
   the selection receiving unit receives a selection of a candidate from the candidates displayed at the acquired display position; and
   the translation unit translate the candidate into the target language by acquiring an example in the target language from the example storage unit, the example corresponding to the acquired semantic class and the selected candidate.

3. The apparatus according to claim 2, wherein the recognizing unit generates a predetermined number of candidates in a descending order of likelihood indicating probability of the candidate.

4. The apparatus according to claim 1, wherein
   the recognizing unit recognizes the received speech and generates candidates of the source language character-string;
   the translation unit acquires an example in the source language matched with each of the generated candidates, and translates the each of the candidates into the target language by acquiring an example in the target language from the example storage unit, the example corresponding to the acquired example in the source language and the semantic class acquired by the acquiring unit;
   the selection receiving unit receives a selection of the example in the source language from the examples in the source language acquired by the translation unit and displayed at the acquired display position; and
   the apparatus further comprises an output controller configured to output an example in the target language corresponding to the selected example in the source language.

5. The apparatus according to claim 4, wherein the recognizing unit generates a predetermined number of candidates in a descending order of likelihood indicating probability of the candidate.

6. The apparatus according to claim 1, wherein the recognizing unit replaces a demonstrative pronoun included in the source language character-string by the name of the acquired associated information.

7. The apparatus according to claim 1, wherein
   the associated-information storage unit stores a name of a display target to be displayed on a map as the name of the associated information, in association with the display position of the display target on the map;
   the dictionary storage unit stores the name of the display target and the semantic class of the name of the display target, in association with each other;

the selection receiving unit receives a selection of the display target displayed at the display position on the map which is displayed at the acquired display position; and the acquiring unit acquires the name of the display target corresponding to the display position of the display target the selection of which is received, from the associated-information storage unit, and acquires the semantic class corresponding to the acquired name of the display target from the dictionary storage unit.

8. The apparatus according to claim 1, wherein the associated information storage unit stores the name of the associated-information and the display position of the associated information on a list displayed in a list form, in association with each other; and the selection receiving unit receives a selection of the associated information displayed at the display position on the list of the associated information which is displayed at the acquired display position.

9. The apparatus according to claim 1, further comprising:

a synthesis unit configured to synthesize the example in the target language acquired by the translation unit to speech in the target language; and an output controller configured to output the synthesized speech in the target language.

10. The apparatus according to claim 1, further comprising:

a co-occurrence-information storage unit configured to store the semantic class and a co-occurrence word in association with each other, the co-occurrence word being a word used together with the word having a semantic attribute represented by the semantic class, wherein the recognizing unit acquires the co-occurrence word corresponding to the semantic class acquired by the acquiring unit for the candidates of the source language character-string, from the co-occurrence-information storage unit, and selects the candidate including the acquired co-occurrence word as the source language character-string.

11. A speech translation method comprising:

receiving speech spoken in a source language;

recognizing the received speech to generate a source language character-string in the source language;

receiving a selection of associated information relating to spoken speech displayed on a display unit;

acquiring a name of the associated information corresponding to a display position of the associated information the selection of which is received, from an associated-information storage unit that stores the name of associated information and the display position of the associated information in association with each other;

acquiring a semantic class representing a semantic attribute of the name of the associated information corresponding to the acquired name of the associated information, from a dictionary storage unit that stores the name of the associated information and the semantic class in association with each other; and translating, using a processor, the recognition result into the target language by defining a search range of a subset of examples in the target language narrowed to those examples stored in an example storage unit having the same semantic class as the acquired semantic class, and acquiring an example in a target language corresponding to the source language character-string and having the same semantic class as the acquired semantic class from the subset of examples stored in the example storage unit storing the semantic class of a word, an example in the source language including the word, and an example in the target language acquired by translating the example in the source language, in association with each other.

12. A computer program product having a non-transitory computer readable medium including programmed instructions for performing speech translation, wherein the instructions, when executed by a computer, cause the computer to perform:

receiving speech spoken in a source language;

recognizing the received speech to generate a source language character-string in the source language;

receiving a selection of associated information relating to spoken speech displayed on a display unit;

acquiring a name of the associated information corresponding to a display position of the associated information the selection of which is received, from an associated-information storage unit that stores the name of associated information and the display position of the associated information in association with each other;

acquiring a semantic class representing a semantic attribute of the name of the associated information corresponding to the acquired name of the associated information, from a dictionary storage unit that stores the name of the associated information and the semantic class in association with each other; and translating the recognition result into the target language by defining a search range of a subset of examples in the target language narrowed to those examples stored in an example storage unit having the same semantic class as the acquired semantic class, and acquiring an example in a target language corresponding to the source language character-string and having the same semantic class as the acquired semantic class from the subset of examples stored in the example storage unit storing the semantic class of a word, an example in the source language including the word, and an example in the target language acquired by translating the example in the source language, in association with each other.

* * * * *